United States Patent [19]
Fuchida

[11] Patent Number: 5,358,320
[45] Date of Patent: Oct. 25, 1994

[54] ANTI-SKID BRAKE CONTROL SYSTEM FOR AUTOMOTIVE VEHICLES

[75] Inventor: Takeshi Fuchida, Atsugi, Japan

[73] Assignee: Atsugi Unisia Corporation, Atsugi, Japan

[21] Appl. No.: 22,222

[22] Filed: Feb. 25, 1993

[30] Foreign Application Priority Data

| Feb. 28, 1992 | [JP] | Japan | 4-009729[U] |
| Feb. 28, 1992 | [JP] | Japan | 4-009730[U] |
| Feb. 28, 1992 | [JP] | Japan | 4-009731[U] |
| Feb. 28, 1992 | [JP] | Japan | 4-009732[U] |

[51] Int. Cl.$^5$ ............................................. B60T 8/32
[52] U.S. Cl. ......................... 303/116.1; 303/117.1; 303/900; 303/901; 303/119.1
[58] Field of Search ............ 303/116.1, 116.2, 116.3, 303/117.1, 119.1, 900, 901, 113.1, 113.2, 113.5, 115.1, 115.4, 115.5, 61-63, 68-69, 110; 188/181 A, 181 R

[56] References Cited

U.S. PATENT DOCUMENTS

| 4,765,692 | 8/1988 | Miyake | 303/900 X |
| 4,936,637 | 6/1990 | Adachi et al. | 303/115.4 |
| 4,957,330 | 9/1990 | Morikawa et al. | 303/110 |
| 5,143,428 | 9/1992 | Toda et al. | 303/900 X |

FOREIGN PATENT DOCUMENTS 3-2870  1/1991  Japan.

*Primary Examiner*—Douglas C. Butler
*Attorney, Agent, or Firm*—Lowe, Price, LeBlanc & Becker

[57] ABSTRACT

A brake-fluid reflux type anti-skid brake control system for automotive vehicles, comprises a main brake-fluid supply circuit, a brake-fluid reflux circuit refluxing the brake fluid from the wheel cylinder to the main brake-fluid supply circuit during operation of the anti-skid brake control system, and a brake-fluid flow control valve arranged in the supply circuit. The flow control valve employs a throttling device responsive to the pressure difference between the master-cylinder side and the fluid pressure of the wheel-cylinder side, such that when the pressure difference is less than a predetermined threshold the throttling device operates at a fully open mode, and when the pressure difference is greater than or equal to the threshold the throttling device operates at a fully throttling mode. The throttling device is further responsive to a steep positive pressure gradient in the fluid pressure of the master-cylinder side, such that the throttling device operates in the fully open mode even when the pressure difference is greater than or equal to the threshold during quick braking.

6 Claims, 3 Drawing Sheets

ANTI-SKID BRAKE CONTROL SYSTEM FOR AUTOMOTIVE VEHICLES

BACKGROUND OF THE INVENTION

1. Field of the Invention

The present invention relates to a brake-fluid reflux type anti-skid brake control system employing a brake-fluid flow control valve controls a flow rate of brake fluid introduced therethrough into the wheel cylinder in response to a pressure difference between a fluid pressure of a master-cylinder side and a fluid pressure of a wheel-cylinder side, and a fluid-pressure pump refluxing the brake fluid in the wheel cylinder just downstream of the master cylinder during an anti-skid brake control at a wheel-cylinder pressure reducing mode at which the wheel-cylinder pressure is reduced, and specifically to a system employing a brake-fluid flow control valve through which in a wheel-cylinder pressure is moderately intensified during operation of the anti-skid brake control system in a wheel-cylinder pressure intensifying mode at which the wheel-cylinder pressure is increased.

2. Background of the Prior Art

Recently, there have been proposed and developed various automotive brake control systems, such as an anti-skid brake control system (generally abbreviated as an "ABS") which is provided for preventing brakes from locking road wheels during quick braking or during braking on a low frictional road surface so as to prevent skidding. In large luxury cars and high-grade vehicles, the ABS is often assembled to provide maximum effective braking, irrespective of the road condition. The ABS permits normal application of the brakes by alternately reducing and intensifying the wheel-cylinder pressure so that braking can be held to just below the point at which a skid would start to develop.

As is generally known, the ABS comes into operation if an electronic control unit detects whether a vehicle wheel is locked during quick braking or braking on a low frictional road surface. At the beginning of the anti-skid brake control, the ABS operates at a wheel-cylinder pressure reducing mode which will be referred to as an "ABS pressure reducing mode". In the ABS pressure reducing mode, the brake fluid in the wheel cylinder is temporarily stored in a brake fluid reservoir through a directional control valve serving as a pressure reducing valve. Thereafter, a fluid-pressure pump is driven with a slight time lag in order to reflux the brake fluid stored in the reservoir to a hydraulic pressure supply line connected to the outlet port of the master cylinder, with the result that the wheel-cylinder pressure is gradually reduced and thus the pressure difference between the fluid pressure of the master-cylinder side and the fluid pressure of the wheel-cylinder side is greater than or equal to a predetermined threshold. Since the fluid-pressure pump is driven only during operation of the ABS, the fluid pump is generally referred to as an "ABS pump". In this manner, the wheel-cylinder pressure is reduced. Consequently, as soon as the control unit detects that the vehicular wheel has been unlocked during operation of the ABS at the ABS pressure reducing mode, a brake fluid introduced from the outlet port of the master cylinder and/or a brake fluid discharged from the ABS pump and refluxed just downstream of the outlet port of the master cylinder are both fed through the directional control valve serving as a pressure intensifying valve to the wheel cylinder. Thus, the wheel-cylinder pressure is increased again.

As set forth above, the wheel-cylinder pressure is suitably adjusted by the ABS so as to effectively prevent an undesirable wheel-lock during quick braking or braking on a low friction road, while providing reasonably high braking force. After the wheel-cylinder pressure control mode is changed from the ABS pressure reducing mode to the ABS pressure intensifying mode, in the above-noted older ABS, there is a tendency for the brake fluids output from the master cylinder and the ABS pump to be rapidly fed into the wheel cylinder. There is a possibility that the wheel is locked again, because of an excessive pressure-rise. In order to solve such a problem, a more recent anti-skid brake control system has a brake-fluid flow control valve arranged in the hydraulic pressure supply line connected to the master cylinder and supplying the fluid pressure to the wheel cylinder. Such a brake-fluid flow control valve operates, so that during operation of the ABS, the flow control valve fully opens when the pressure difference between the fluid pressure of the master-cylinder side and the fluid pressure of the wheel-cylinder side is less than a predetermined threshold, and the flow control valve fully throttles the fluid flow therethrough when the pressure difference is greater than or equal to the threshold. Thus, a gradient of the pressure-rise in the wheel cylinder can be maintained at a relatively low level in the ABS pressure intensifying mode so as to suppress an excessive pressure-rise and to assure a moderate pressure-rise in the wheel cylinder. In other words, such a more recent ABS exhibits superior moderate wheel-cylinder pressure intensifying characteristics during operation. One such ABS has been disclosed in Japanese Utility Model First Publication (Jikkai) Heisei No. 3-2870.

The ABS employing a brake-fluid flow control valve is advantageous to reliably avoid wheel-lock. However, since the brake-fluid flow control valve is designed to fully throttle a brake-fluid passage area when the pressure difference between the fluid pressure of the master-cylinder side and the fluid pressure of the wheel-cylinder side is greater than or equal to the predetermined threshold value, the flow control valve may operate to provide a restricted fluid flow through an orifice constriction, even during quick braking where the vehicular wheel is not yet locked and the ABS is deactivated. In this case, an effective quick braking effect cannot be obtained, i.e., a quick braking response is deteriorated, because of flow restriction of the flow control valve.

In addition to the above, the conventional ABS is usually constructed, such that in four-wheeled vehicles, one of four brake-fluid flow control valves employed in the ABS is associated with each one of four wheels, namely a front-left wheel, a front-right wheel, a rear-left wheel and a rear-right wheel, in order to obtain an optimal moderate wheel-cylinder pressure intensifying characteristics with regard to each wheel cylinder, during an anti-skid brake control. This results in high manufacturing costs in four-wheeled vehicles having an ABS with four brake-fluid flow control valves. As will be appreciated from the above, it is more desirable that only one brake-fluid pressure control valve is applied commonly to a plurality of wheel cylinders, such as right and left wheel-cylinders, in such a manner as to obtain identical moderate wheel-cylinder pressure intensifying characteristics in respective wheel cylinders during operation of the ABS and to insure a high braking response during quick braking where the vehicular wheel is not yet locked under a deactivated condition of the ABS.

SUMMARY OF THE INVENTION

It is, therefore, in view of the above disadvantages, a principal object of the present invention to provide a brake-fluid reflux type anti-skid brake control system employing a brake-fluid flow control valve arranged in a hydraulic line disposed between a master cylinder and a wheel cylinder, which assures a moderate wheel-cylinder pressure intensifying characteristics in an ABS pressure intensifying mode during operation of the ABS and insures a high braking response during quick braking where the vehicular wheel is not yet locked and the ABS is conditioned in a deactivated state.

It is another object of the invention to provide a brake-fluid reflux type anti-skid brake control system employing at least two brake-fluid flow control valves which can assure a moderate wheel-cylinder pressure intensifying characteristics during operation of the ABS and insure a high braking response even during quick braking where the road wheel is not yet locked and the ABS is deactivated, while limiting the number of the flow control valves to a minimum.

It is a further object of the invention to provide a brake-fluid reflux type anti-skid brake control system employing at least two brake-fluid flow control valves in which the lay-out of the system can be simplified and moderate wheel-cylinder pressure intensifying characteristics for the plural wheel cylinders can be obtained by the minimum number of flow control valves.

In order to accomplish the aforementioned and other objects, a brake-fluid reflux type anti-skid brake control system for automotive vehicles comprises a main brake-fluid supply circuit for supplying a brake fluid from a master cylinder to a wheel cylinder, during braking, a brake-fluid reflux circuit arranged in parallel with the main brake-fluid supply circuit, for pressurizing and refluxing the brake fluid from the wheel cylinder to the main brake-fluid supply circuit during operation of the anti-skid brake control system, flow control valve means being arranged in the main brake-fluid supply circuit, for controlling a flow rate of the brake fluid introduced into the wheel cylinder in response to a pressure difference between the fluid pressure of the master-cylinder side and the fluid pressure of the wheel-cylinder side, the flow control valve means operating in two operational modes, one being a fully open mode in which the flow control valve means provides a maximum flow rate of the brake fluid and the other being a fully throttling mode in which the flow control valve means provides a minimum flow rate of the brake fluid, and the flow control value means includes means responsive to a pressure gradient in the fluid pressure of the master-cylinder side as well as the pressure difference, for switching from one of the operational modes to the other, such that the flow control valve means operates in the fully open mode when the pressure difference is less than a predetermined threshold value during normal braking or when the pressure difference is greater than or equal to the predetermined threshold value during quick braking where the anti-skid brake control system is conditioned in an inoperative state, and operates in the fully throttling mode when the pressure difference is greater than or equal to the predetermined threshold value during operation of the anti-skid bake control system.

According to another aspect of the invention, a brake-fluid reflux type anti-skid brake control system for automotive vehicles, comprises a main brake-fluid supply circuit for supplying a brake fluid from a master cylinder to a wheel cylinder during braking, a brake-fluid reflux circuit arranged in parallel with the main brake-fluid supply circuit, for pressurizing and refluxing the brake fluid from the wheel cylinder to the main brake-fluid supply circuit during operation of the anti-skid brake control system, flow control valve means being arranged in the main brake-fluid supply circuit, for controlling a flow rate of the brake fluid introduced into the wheel cylinder in response to a pressure difference between the fluid pressure of the master-cylinder side and the fluid pressure of the wheel-cylinder side, such that when the pressure difference is less than a predetermined threshold value the flow control valve means operates in a fully open mode in which the flow control valve means provides a maximum flow rate of the brake fluid, and when the pressure difference is greater than or equal to the predetermined threshold value the flow control valve means operates in a fully throttling mode in which the flow control valve means provides a minimum flow rate of the brake fluid, and the flow control valve means including a valve housing defining a substantially cylindrical hollow therein, a piston slidably enclosed in the cylindrical hollow to be movable depending on the pressure difference, partition means arranged in the cylindrical hollow for partitioning an internal space facing onto one end of the piston into first and second fluid chambers, the first fluid chamber being arranged in series to the main brake-fluid supply circuit to introduce the fluid pressure of the master-cylinder side into the wheel cylinder therethrough, the second fluid chamber connected to a communication passage to receive the fluid pressure of the master-cylinder side, the housing cooperative with the piston to define a third fluid chamber essentially corresponding to an internal space facing onto the other end of the piston, the third fluid chamber receiving the fluid pressure of the wheel-cylinder side, and a throttling valve arranged in the first fluid chamber to operate at either one of the two modes based on an axial sliding movement of the piston, an area of a first pressure receiving surface of the piston facing onto the first fluid chamber being considerably smaller than an area of a second pressure receiving surface of the piston facing onto the second fluid chamber such that the first pressure receiving surface is insusceptible to a rapid pressure-rise in the first fluid chamber during quick braking where the anti-skid brake control system is in an inoperative state, and an orifice being provided in the communication passage and responsive to a steep pressure gradient in the fluid pressure of the master-cylinder side such that a pressure-rise in the second fluid chamber is suppressed through an orifice constriction of the orifice during quick braking. It is preferable that the sum of the areas of the first and second pressure receiving surfaces is equal to an area of a third pressure receiving surface of the piston facing onto the third fluid chamber.

According to a further aspect of the invention, a brake-fluid reflux type anti-skid brake control system for automotive vehicles, comprises a main brake-fluid supply circuit for supplying a brake fluid from a master cylinder to a wheel cylinder during braking, a brake-fluid reflux circuit arranged in parallel with the main brake-fluid supply circuit, for pressurizing and refluxing the brake fluid from the wheel cylinder to the main brake-fluid supply circuit during operation of the anti-skid brake control system flow control valve means being arranged in the main brake-fluid supply circuit, for controlling a flow rate of the brake fluid introduced into the wheel cylinder in response to a first pressure difference between the fluid pressure of the master-cylinder side and the fluid pressure of the wheel-cylinder side, such that when the first pressure difference is less than a predetermined threshold value the flow control valve means operates in a fully open mode in which the flow control valve means provides a maximum flow rate of the brake fluid, and when the first pressure difference is greater than or equal to the predetermined threshold value the flow control valve means operates in a fully throttling mode in which the flow control valve means provides a minimum flow rate of the brake fluid, and the flow control valve means including a valve housing defining a substantially cylindrical hollow therein, a piston slidably enclosed in the cylindrical hollow to be movable depending on the first pressure difference, partition means arranged in the cylindrical hollow for partitioning an internal space facing onto one end of the piston into first and second fluid chambers, the first fluid chamber being arranged in series to the main brake-fluid supply circuit to introduce the fluid pressure of the master-cylinder side into the wheel cylinder therethrough, the second fluid chamber connected to a communication passage to receive the fluid pressure of the master-cylinder side, the housing cooperative with the piston to define a third fluid chamber essentially corresponding to an internal space facing onto the other end of the piston, the third fluid chamber receiving the fluid pressure of the wheel-cylinder side, an orifice being provided in the communication passage and responsive to a steep pressure gradient in the fluid pressure of the master-cylinder side to cause a second pressure difference between the first and second pressure chambers, and a throttling valve arranged in the first fluid chamber to operate at either one of the two modes, the throttling valve including a valve body and a spring resiliently biasing the valve body to the one end of the piston, the valve body slidably received by the partition means, one end of the valve body facing onto the first fluid chamber and the other end of the valve body facing onto the second fluid chamber, whereby the valve body is movable depending on the second pressure difference such that the valve body moves along with the piston when the second pressure difference is less and moves away from the piston when the second pressure difference is great.

According to a still further aspect of the invention, a brake-fluid reflux type anti-skid brake control system for automotive vehicles, comprises a main brake-fluid supply circuit for supplying a brake fluid from a master cylinder to left and right wheel cylinders during braking, a brake-fluid reflux circuit arranged in parallel with the main brake-fluid supply circuit, for pressurizing and refluxing the brake fluid from the wheel cylinders to the main brake-fluid supply circuit during the anti-skid brake control system, flow control valve means being arranged in the main brake-fluid supply circuit, for controlling a flow rate of the brake fluid introduced into each of the wheel cylinders in response to a pressure difference between the fluid pressure of the master-cylinder side and the fluid pressure of the wheel-cylinder side, such that when the pressure difference is less than a predetermined threshold value the flow control valve means operates in a fully open mode in which the flow control valve means provides a maximum flow rate of the brake fluid, and when the pressure difference is greater than or equal to the predetermined threshold value the flow control valve means operates in a fully throttling mode in which the flow control valve means provides a minimum flow rate of the brake fluid, and the flow control valve means including a valve housing defining a substantially cylindrical hollow therein, a piston slidably enclosed in the cylindrical hollow to be movable depending on the pressure difference, partition means arranged in the cylindrical hollow for defining a first fluid chamber facing onto one end of the piston, the first fluid chamber being arranged in series to the main brake-fluid supply circuit to introduce the fluid pressure of the master-cylinder side into the wheel cylinders therethrough, the housing cooperative with the piston to define second and third fluid chambers, the second fluid chamber connected through a communication passage to the right wheel cylinder to receive the fluid pressure of the right wheel-cylinder side, the third fluid chamber connected through another communication passage to the left wheel cylinder to receive the fluid pressure of the left wheel-cylinder side, and an orifice being provided in either one of the two communication passages to restrict the brake fluid flow directed out of the fluid chamber associated with the communication passage having the orifice, during quick braking. An area of a second pressure receiving surface of the piston facing onto the second fluid chamber may be equal to an area of a third pressure receiving surface of the piston facing onto the third fluid chamber, so that the flow control valve acts equivalently to right and left wheel cylinders. Moreover, it is preferable that the sum of the areas of the second and third pressure receiving surfaces is equal to an area of a first pressure receiving surface of the piston facing onto the first fluid chamber.

DESCRIPTION OF THE PREFERRED EMBODIMENTS

First embodiment

Figure 1:
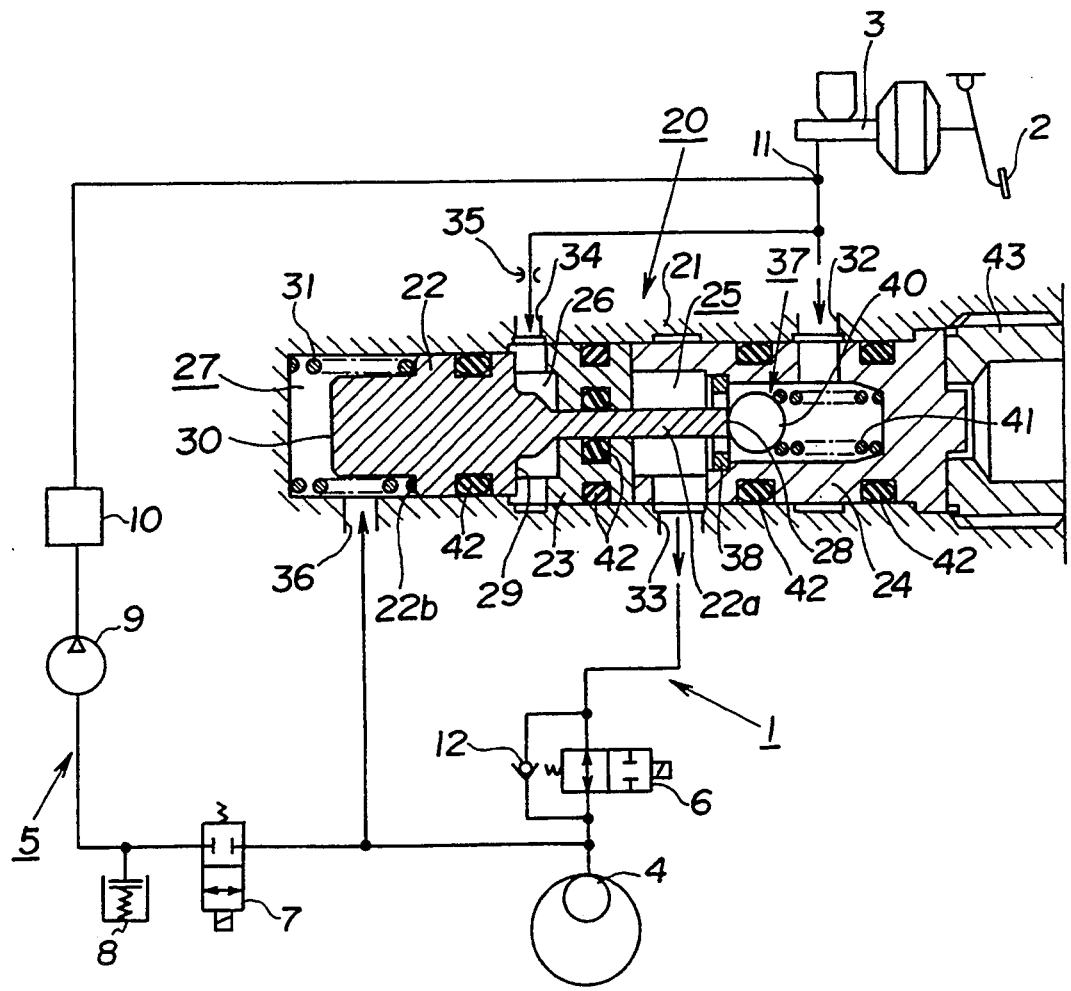
FIG. 1 is a schematic system diagram illustrating a first embodiment of a brake-fluid reflux type anti-skid brake control system according to the invention.
Figure 2:
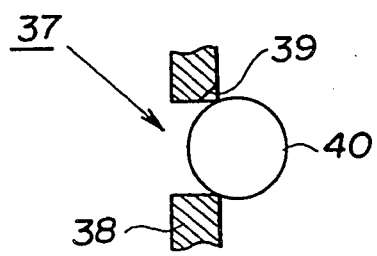
FIG. 2 is a partial cross-sectional view illustrating a spring-loaded ball-type throttling device which is applied for a brake-fluid flow control valve employed in the ABS of the first embodiment of FIG. 1 and for a brake-fluid flow control valve employed in the ABS of a third embodiment shown in FIG. 5.

Referring now to the drawings, particularly to FIGS. 1 and 2, there is shown a brake-fluid reflux type anti-skid brake control system employing a brake-fluid flow control valve applied for either one of vehicular wheels. The brake-fluid reflux type anti-skid brake control system of the first embodiment includes a main brake-fluid supply circuit 1 arranged between a master cylinder 3 which generates a master-cylinder pressure varied depending on a depressing amount of a brake pedal 2 during normal braking and a wheel cylinder 4. The ABS of the first embodiment includes a brake-fluid reflux circuit 5 arranged for refluxing the brake fluid in the wheel cylinder 4 to the main brake-fluid supply circuit 1, during operation of the ABS. The brake-fluid reflux circuit 5 and the main brake-fluid supply circuit 1 are arranged in parallel with each other between the master cylinder 3 and the wheel cylinder 4. The ABS includes a normally open type inlet valve 6, serving as a switching valve acting to establish and block fluid communication between the main circuit 1 and an inlet-and-outlet port of the wheel cylinder 4, and a normally closed type outlet valve 7, serving as a switching valve acting to establish and block fluid communication between the reflux circuit 5 and the inlet-and-outlet port of the wheel cylinder 4. The inlet valve 6 is arranged in the main circuit 1, while the outlet valve 7 is arranged in the reflux circuit 5. These switching valves 6 and 7 are switchable depending on the skidding condition of the vehicular wheel, in response to control signals from a control unit (not shown). As clearly seen in FIG. 1, the inlet valve 6 is comprised of a normally open type, two-port two-position electromagnetic solenoid valve, while the outlet valve 7 is comprised of a normally closed type, two-port two-position electromagnetic solenoid valve.

In the reflux circuit 5, arranged are a brake-fluid reservoir 8 temporarily storing the brake fluid exhausted through the outlet valve 7, a so-called ABS pump 9 pressurizing and discharging the brake fluid temporarily stored in the reservoir 8, and a brake-fluid pressure damping chamber 10 regulating positive and negative pressure fluctuations in the discharged fluid pressure from the pump. In the ABS pressure reducing mode, the brake fluid in the wheel cylinder 4 is refluxed through the outlet valve 7, the reservoir 8, the ABS pump 9, and the damping chamber 10 to the main circuit 1, in that order.

As shown in FIG. 1, a brake-fluid flow control valve 20 is arranged between the inlet valve 6 and a confluent point 11 converging the two circuits 1 and 5 to each other just downstream of the outlet port of the master cylinder 3, so as to assure a moderate wheel-cylinder pressure intensifying characteristics in the ABS pressure intensifying mode. In the first embodiment, a check valve 12 is arranged parallel to the inlet valve 6, in order to return the brake fluid in the wheel cylinder 4 to the master cylinder 3 when the brake is released. Such a check valve may be arranged between the inlet-and-outlet port of the wheel cylinder and the confluent point 11 in such a manner as to by-pass both the inlet valve 6 and the flow control valve 20. Although it is not shown in the drawings, a pair of check valves are respectively arranged just upstream of the outlet port of the ABS pump and just downstream of the inlet port of the ABS pump in a conventional manner, in order to prevent the master-cylinder pressure from being transmitted through the pressure damping chamber and the ABS pump 9 to the reservoir 8, during normal braking operation.

The brake-fluid flow control valve 20 includes a substantially cylindrical valve housing 21 defining a cylindrical hollow therein, an axially slidable piston 22 enclosed in the housing 21, and first and second partition members 23 and 24. As seen in FIG. 1, a first fluid chamber 25, a second fluid chamber 26, and a third fluid chamber 27 are defined in the cylindrical hollow of the housing 21, when inserting the piston 22, the first and second partition members 23 and 24 through the opening end of the housing into the cylindrical hollow, in that order. The piston 22 has a first pressure receiving surface 28 responsive to a fluid pressure in the first fluid chamber 25, a second pressure receiving surface 29 responsive to a fluid pressure in the second fluid chamber 26, and a third pressure receiving surface 30 responsive to a fluid pressure in the third fluid chamber 27. The first pressure receiving surface 28 is formed on an end surface of an elongated small-diameter portion 22a penetrating through the partition member 23 and axially extending from a substantially center portion of the piston 22 forming the second pressure receiving surface 29 into the first Fluid chamber 25. As appreciated from FIG. 1, note that an area of the first pressure receiving surface 28 is set at a considerably small value when compared with an area of the second pressure receiving surface 29. Reference numeral 22b designates a spring seat formed on the third pressure receiving surface 30 of the piston 22. A return spring 31 is operably disposed between the spring seat 22b and an inner end wall of the cylindrical hollow of the housing 21 defining the third fluid chamber 27 in combination with the left side end of the piston 22, with the result that the piston 22 is normally biased rightwards (viewing FIG. 1). In the flow control valve 20 of the first embodiment, the total area obtained by adding the area of the first pressure receiving surface 28 to the area of the second pressure receiving surface 29 is designed to be equal to the area of the third pressure receiving surface 30.

The valve housing 21 has four ports, namely first and second ports 32 and 33 respectively exposing to the first fluid chamber 25, a third port 34 exposing to the second fluid chamber 26, and a fourth port 36 exposing to the third fluid chamber 27. The first port 32 communicates the first fluid chamber 25 with the outlet port of the master cylinder 3, while the second port 33 communicates the first fluid chamber 25 with the inlet port of the inlet valve 6, in such a manner as to supply the brake fluid in the hydraulic line arranged just downstream of the master cylinder 3 to the wheel cylinder 4 via the first fluid chamber 25. The third port 34 is connected through a fixed orifice 35 to the hydraulic line arranged between the confluent point 11 and the first port 32, such that the fluid pressure of the master cylinder side is smoothly introduced through the third port 34 into the second fluid chamber 26 during normal braking or during the anti-skid brake control, and that the brake-fluid flowing through the orifice 35 via the third port 34 into the second fluid chamber 26 is choked through an orifice constriction during quick braking where the ABS is deactivated. The fourth port 36 is connected to the inlet-and-outlet port of the wheel cylinder 4 in such a manner as to introduce the wheel cylinder pressure into the third fluid chamber 27.

The flow control valve 20 also includes a throttling valve 37 disposed in an intermediate fluid passage arranged between the first and second ports 32 and 33. As shown in FIG. 1, the throttling valve 37 includes a spring-loaded ball-type valve body 40, and a return spring 41. The valve body 40 is normally biased leftwards (viewing FIG. 1) by means of the return spring 41, in such a manner as to abut the spherical surface of the ball-type valve body 40 onto the end surface of the small-diameter portion 22a of the piston 22. As best shown in FIG. 2, the throttling valve 37 also includes a valve seat 38 having a slightly notched, flow restricting orifice portion 39. The valve seat is firmly fixed on the inner peripheral wall of the partition member 24 to surround the end of the small-diameter portion 22a of the piston, such that the orifice portion 39 exhibits a flow restriction effect when the valve body 40 comes into contact with the valve seat 38. With this arrangement, the intermediate fluid passage defined between the two ports 32 and 33 is fully throttled when the valve body 40 comes into contact with the valve seat 38, and fully opened when the valve body 40 is moved away from the valve seat 38 and kept in a rightmost position. With regard to the members 31, 22, 40 and 41 arranged in series to each other, respective spring constants of the springs 31 and 41 are designed, so that the valve body 40 is kept in a fully open position when the difference between a fluid pressure applied to the first fluid chamber 25 and a fluid pressure applied to the third fluid chamber 27 and the difference between a fluid pressure applied to the second fluid chamber 26 and a fluid pressure applied to the third fluid chamber 27 are both below a predetermined threshold value, while the valve body 40 is kept in a fully throttling position when the previously noted two pressure differences is the predetermined threshold value or above. As seen in FIG. 1, a plurality of seal members 42 are respectively attached onto the outer periphery of the piston 22, the outer periphery of the first partition member 23, and the outer periphery of the second partition member 24, so as to seal apertures defined between the respective outer peripheral surfaces of the inserted members and the inner peripheral surface of the valve housing 21, in a fluid tight fashion. Reference numeral 43 designates a plug being screwed from the opening end of the valve housing 21, in order to precisely position the inserted members 22, 23 and 24.

The flow control valve 20 employed in the ABS of the first embodiment operates as follows.

During normal braking, the master-cylinder pressure generated by the master cylinder 3 is increased in accordance with an increase in depression amount of the brake pedal 2. The master-cylinder pressure acts on both the first and second fluid chambers 25 and 26. On the other hand, the control unit (not shown) generates zero-duty signals to the inlet valve 6 and the outlet valve 7, such that the inlet valve 6 is maintained in a valve fully open position and the outlet valve 7 is maintained in a valve fully closed position. Under these conditions, the brake fluid in the wheel cylinder 4 is not exhausted through the outlet valve 7 into the reservoir 8, and thus the pressure difference between the first fluid chamber 25 and the third fluid chamber 27, and the pressure difference between the second fluid chamber 26 and the third fluid chamber 27 are both kept at a lower level than a predetermined threshold valve. As a result, the throttling valve 37 is kept in the valve fully open position. Thus, the master-cylinder pressure is fed through the flow control valve 20 conditioned in the fully open state, and the inlet valve 6 conditioned in the fully open state to the wheel cylinder 4. In this manner, the wheel-cylinder pressure is increased in accordance with the increase in the master-cylinder pressure, to assure a superior braking response during normal braking.

During the anti-skid brake control, the control unit generates 100%-duty signals to the inlet valve 6 and the outlet valve 7, with the result that the inlet valve 6 is shifted from the fully open position to the fully closed position, while the outlet valve 7 is shifted from the fully closed position to the fully open position. After shifting to the fully open position of the outlet valve 7, the ABS pump 9 is driven with a slight time lag. Just after shifting the valve 7, the brake fluid in the wheel cylinder 4 is exhausted into the reflux circuit 5 and temporarily stored through the inlet valve 7 into the reservoir 8. The temporarily stored in the reservoir 8 is fed through the ABS pump 9 and the damping chamber 10 to the confluent point 11, and therefore the wheel-cylinder pressure is gradually reduced during operation of the ABS pump. In this manner, the pressure-drop in the wheel cylinder 4 develops to a considerable degree, so as to prevent the vehicular wheel from locking. In the previously noted ABS pressure reducing mode, the pressure difference between the first fluid chamber 25 and the third fluid chamber 27 and the pressure difference between the second fluid chamber and the third fluid chamber 27 both reach the predetermined threshold value and become greater than the same, because of the pressure-drop in the wheel cylinder. Under this condition, the piston 22 moves leftwards against the spring force caused by the spring 31. The abutment surface between the end of the small-diameter portion 22a of the piston 22 and the spherical surface of the valve body 40 is also moved leftwards. Consequently, the throttling valve 37 is shifted from the fully open position to the fully throttling position in which the ball-type valve body 40 is received by the valve seat 38 at the aid of spring force caused by the spring 41. At the end of the ABS pressure reducing mode, the throttling valve 37 is kept in the fully throttling position. Thereafter, as soon as the control unit detects that the wheel is unlocked, the operational mode of the ABS is changed from the ABS pressure reducing mode to the ABS pressure intensifying mode. In the ABS pressure intensifying mode, the control unit generates zero-duty signals to the two switching valves 6 and 7, with the result that the inlet valve 6 is switched from the fully closed position to the fully open position and the outlet valve 7 is switched from the fully open position to the fully closed position. At the beginning of the ABS pressure intensifying mode, since the pressure difference between the first fluid chamber 25 and the third fluid chamber 27 and the pressure difference between the second fluid chamber 26 and the third fluid chamber 27 are still above the predetermined threshold, the flow control valve 20 is maintained in the fully throttling state. Therefore, the flow control valve 20 operates to provide a designated restricted brake-fluid flow through an orifice constriction in the ABS pressure intensifying mode, until the above-noted pressure differences become below the predetermined threshold. In this manner, the ABS of the first embodiment controls the wheel-cylinder pressure, such that the wheel-cylinder pressure is moderately intensified with a designated gradient of pressure-rise, so as to assure a moderate wheel-cylinder pressure intensifying characteristics In the ABS pressure intensifying mode.

During quick braking, such as hard braking on dry pavement, the master-cylinder pressure is rapidly increased in accordance with a rapid depression of the brake pedal 2. Assuming that the wheel is still not locked due to such a high frictional road surface irrespective of hard braking, the ABS is conditioned in its deactivated state. In this case, the fluid flow having the rapidly increased master-cylinder pressure into the second fluid chamber 26 is constricted by means of the fixed orifice 35 and therefore a change in fluid pressure in the second fluid chamber 26 is very little, whereby the pressure difference between the second fluid chamber 26 and the third fluid chamber 27 is maintained below the predetermined threshold. On the other hand, the fluid flow having the same into the first fluid chamber 25 is permitted by means of the throttling valve 37 conditioned in its fully open state, with the result that the fluid pressure in the first fluid chamber 25 is quickly increased. The pressure difference between the first fluid chamber 25 and the third fluid chamber 27 thus becomes above the predetermined threshold. However, since the area of the first pressure receiving surface 28 is designed to be considerably smaller than the area of the second pressure receiving surface 29, an axially leftward pushing force obtained by multiplying the area of the first pressure receiving surface 28 by the rapidly increased, incoming master-cylinder pressure is very small, the piston 22 is hardly shifted from the rightmost position to the leftmost position and consequently the flow control valve 20 is retained substantially in the fully open position. As set forth above, the master-cylinder pressure is quickly fed through the flow control valve 20 conditioned in the valve open position and the inlet valve 6 conditioned in the fully open position into the wheel cylinder 4, during quick braking where the ABS is still deactivated. As will be appreciated from the above, the construction of the flow control valve 20 of the first embodiment insures a high braking response even during quick braking.

Second embodiment

Figure 3:
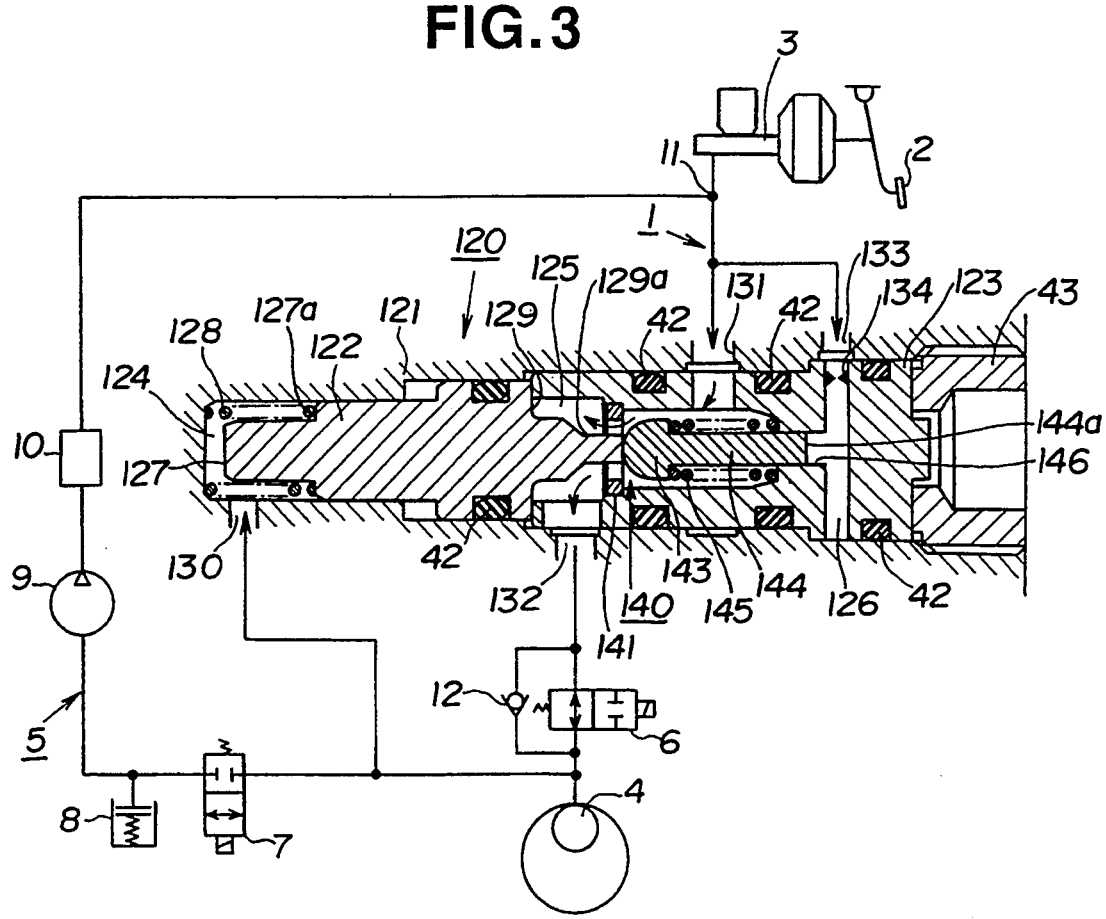
FIG. 3 is a schematic system diagram illustrating a second embodiment of a brake-fluid reflux type anti-skid brake control system according to the invention.
Figure 4:
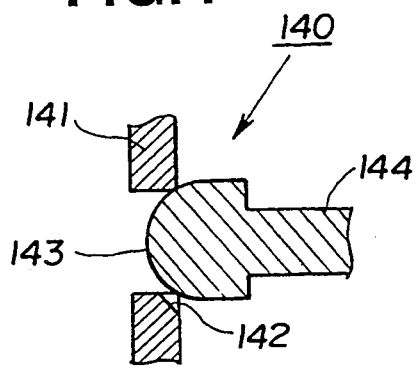
FIG. 4 is a partial cross-sectional view illustrating a mushroom-type throttling device which is applied for a brake-fluid flow control valve employed in the ABS of the second embodiment of FIG. 3.

Referring now to FIGS. 3 and 4, there is shown a brake-fluid reflux type anti-skid brake control system including a brake-fluid flow control valve having a mushroom-type throttling device. The brake fluid flow control valve employed in the brake-fluid reflux type anti-skid brake control system of the second embodiment is different from that of the first embodiment, in that the ball-type valve body 40 of the throttling valve 37 operably disposed in the first fluid chamber 25 is replaced with a mushroom-type valve body 143 of a throttling valve 140, and that an axially rightward movement of the mushroom-type valve body 143 can be caused due to the pressure difference between a first fluid chamber 125 and a second fluid chamber 126.

Basically, the construction of the ABS of the second embodiment is similar to that of the first embodiment. For the purpose of simplification of description, the same reference numerals used in the anti-skid brake control system of the first embodiment will be applied to the corresponding elements used in the second embodiment of FIGS. 3 and 4.

As shown in FIG. 3, the brake-fluid flow control valve 120 of the second embodiment is arranged between the inlet valve 6 and the confluent point 11. The brake-fluid flow control valve 120 includes a substantially cylindrical valve housing 121, an axially slidable piston 122, and a partition member 123. A first fluid chamber 125, a second fluid chamber 126, and a third fluid chamber 124 are defined in the cylindrical hollow bored in the housing 121, when inserting the piston 122 and the partition member 123 into the cylindrical hollow of the housing 121. The piston 122 has a first pressure receiving surface 129 responsive to the fluid pressure in the first fluid chamber 125, and a third pressure receiving surface 127 responsive to the fluid pressure in the third fluid chamber 124. Reference numeral 127a designates a spring seat formed on the third pressure receiving surface 127 of the piston 122. A return spring 128 is operably disposed between the spring seat 127a and the inner end wall of the housing 121 defining the third fluid chamber 124 by virtue of the left side end of the piston 122, and thus the piston 122 is normally biased rightwards (viewing FIG. 3).

The valve housing 121 of the second embodiment has four ports, namely first and second ports 131 and 132 respectively exposing to the first fluid chamber 125, a third port 133 exposing to a second fluid chamber 126 hereinbelow described in detail, and a fourth port 130 exposing to the third fluid chamber 124. The first port 131 communicates the first fluid chamber 125 with the outlet port of the master cylinder 3, while the second port 132 communicates the first fluid chamber 125 with the inlet port of the inlet valve 6. The fourth port 130 is connected to the inlet-and-outlet port of the wheel cylinder 4, such that the third pressure receiving surface 127 is susceptible to a change in the wheel-cylinder pressure.

The flow control valve 120 of the second embodiment also includes a throttling valve 140 disposed in an intermediate fluid passage arranged between the first and second ports 131 and 132. As seen in FIG. 3, the throttling valve 140 includes a spring-loaded mushroom-type valve body 143 having an axially extending small-diameter portion 144 and a return spring 145. The mushroom-type valve body 143 is normally biased leftwards by means of the return spring 145, in such a manner as to abut the semi-spherical surface of the mushroom-type valve body 143 onto the end surface of a small-diameter push rod portion 129a of the piston 122. The elongated small-diameter portion 144 of the throttling valve 140 is received in a fluid-tight fashion by means of an essentially cylindrical bearing surface 146 axially bored in the right-hand section of the partition member 123. As best shown in FIG. 4, the throttling valve 140 also includes a valve seat 141 having a slightly notched, flow restricting orifice portion 142. The valve seat 141 is firmly fixed on the inner peripheral wall of the partition member 123 to surround the end of the small-diameter portion 129a of the piston 122, such that the orifice portion 142 exhibits a flow restriction effect when the valve body 143 comes into contact with the valve seat 141.

Returning to FIG. 3, the partition member 123 defines the second fluid chamber 126 in the right-hand section thereof. The second fluid chamber 126 communicates with an essentially cylindrical hollow defined by the cylindrical bearing surface 146, so that the fluid pressure in the second fluid chamber 126 acts on the right end of the elongated small-diameter portion 144. That is, the right end surface of the small-diameter portion 144 of the throttling valve 140 corresponds to a second pressure receiving surface 144a responsive to the fluid pressure in the second fluid chamber 126. In the flow control valve 120 of the second embodiment, since the mushroom-type valve body itself can be axially actuated in its right direction through the pressure difference between two different pressure chambers, namely the first and second fluid chambers 125 and 126, the area relationship between the first, second, and third pressure receiving surfaces 129, 144a, and 127 is not so important, although in the flow control valve 20 of the first embodiment, it is very important to provide a predetermined area relationship between the first, second, and third pressure receiving surfaces 28, 29, and 30. In the second embodiment, it is advantageous that an area of a pressure receiving surface of the mushroom-type valve body 143 receiving the fluid pressure in the first fluid chamber 125 is designed to be equal to the area of the second pressure receiving surface 144a receiving the fluid pressure in the second fluid chamber 126, so as to assure an axial movement of the valve body 143 with a high response to the pressure difference between the two chambers 125 and 126.

As shown in FIG. 3, the flow control valve 120 includes a fixed orifice 134 defined in the right-hand section of the partition member 123 and arranged in the vicinity of the third port 133 of the housing 121. The orifice 134 operates to restrict the fluid flow introduced into the second fluid chamber 126. Although the orifice is arranged in the vicinity of the third port 133 and in provided in the partition member 123, the orifice may be arranged in a communication line interconnecting the third port 133 and the main circuit 1. Actually, the orifice 134 operates, such that the fluid pressure of the master cylinder side is smoothly introduced through the third port 133 into the second fluid chamber 126 during normal braking or during the anti-skid brake control, and that the master-cylinder pressure is very slowly introduced through the orifice 134 via the third port 133 into the second fluid chamber 126 during quick braking where the ABS is not operated.

With the above-noted arrangement, the intermediate fluid passage arranged between the first and second ports 131 and 132 is fully throttled when the valve body 143 comes into contact with the valve seat 141, and fully opened when the valve body 143 is moved away from the valve seat 141 and consequently the piston 122 is kept in its rightmost position. With regard to the members 128, 122, 143 and 145 arranged in series to each other, respective spring constants of the springs 128 and 145 are designed so that the valve body 143 is kept in a fully open position when the pressure difference between the first fluid chamber 125 and the third fluid chamber 124 and the pressure difference between the second fluid chamber 126 and the third fluid chamber 124 are both below a predetermined threshold value, while the valve body 143 is kept in a fully throttling position when the above-noted two pressure differences are greater than or equal to the predetermined threshold value.

The flow control valve 120 employed in the ABS of the second embodiment operates as follows.

During normal braking, the master-cylinder pressure is increased in accordance with an increase in depression amount of the brake pedal 2. The master-cylinder pressure acts on the first and second fluid chambers 125 and 126. The control unit generates zero-duty signals to the two valves 6 and 7, with the result that the inlet valve 6 is kept in a fully open position and the outlet valve 7 is kept in a fully closed position. The brake fluid in the wheel cylinder 4 is not exhausted into the reservoir 8 because of the fully closed valve 7. As a result, the pressure difference between the first fluid chamber 125 and the third fluid chamber 124 and the pressure difference between the second fluid chamber 126 and the third fluid chamber 124 are both kept at a lower level than a predetermined threshold value and whereby the throttling valve 140 is kept in the valve fully open position. Therefore, the master-cylinder pressure is fed through the flow control valve 120 and the inlet valve 6 to the wheel cylinder 4, thereby resulting in an increase in the wheel-cylinder pressure. As appreciated from the above, the flow control valve 120 of the second embodiment assures a high braking response during normal braking.

During the anti-skid brake control, the control unit generates 100%-duty signals to the two valves 6 and 7 and thus the inlet valve 6 is shifted to the fully closed state, while the outlet valve 7 is shifted to the fully open state. After shifting the valve 7, the ABS pump 9 is driven with a slight time lag. Through rotation of the ABS pump, the brake fluid in the wheel cylinder 4 is exhausted into the reflux circuit 5. The exhausted fluid is returned through the reservoir 8, the ABS pump 9, and the damping chamber 10 to the confluent point 11. In this manner, the wheel-cylinder pressure is gradually reduced and the pressure-drop in the wheel cylinder develops to a considerable degree. In the above-mentioned ABS pressure reducing mode, the pressure difference between the first fluid chamber 125 and the third fluid chamber 124 and the pressure difference between the second fluid chamber 126 and the third fluid chamber 124 both become greater than the predetermined threshold value. Under this condition, the piston 122 moves leftwards against the spring force caused by the spring 128. The abutment surface between the end of the small-diameter portion 129a of the piston 122 and the semi-spherical surface of the valve body 143 is moved leftwards, with the result that the throttling valve 140 is shifted from the fully open position to the fully throttling position where the mushroom-type valve body 143 is received by the valve seat 141 at the aid of the spring force caused by the spring 145. At the end of the ABS pressure reducing mode, the throttling valve 140 is kept in the fully throttling position. Thereafter, as soon as the control unit detects that the wheel is unlocked, the operational mode is shifted from the ABS pressure reducing mode to the ABS pressure intensifying mode. In the ABS pressure intensifying mode, the control unit generates zero-duty signals to the two valves 6 and 7, with the result that the inlet valve 6 is returned to the fully open position, while the outlet valve 7 is returned to the fully closed position. At the beginning of the ABS pressure intensifying mode, since the pressure difference between the first fluid chamber 125 and third fluid chamber 124 and the pressure difference between the second fluid chamber 126 and the third fluid chamber 124 are still above the predetermined threshold, the flow control valve 120 is maintained in the fully throttling state. Therefore, the flow control valve 120 operates to provide a designated restricted brake-fluid flow through an orifice constriction in the ABS pressure intensifying mode, until the above-noted pressure differences become below the predetermined threshold. In this manner, the ABS of the second embodiment controls the wheel-cylinder pressure, such that the wheel-cylinder pressure is moderately intensified at a designated gradient of pressure-rise, so as to assure a moderate wheel-cylinder pressure intensifying characteristics in the ABS pressure intensifying mode.

During quick braking on dry pavement, the master-cylinder pressure is rapidly increased in accordance with a rapid depression of the brake pedal 2. Assuming that the wheel is still not locked due to such a high frictional road surface irrespective of hard braking, the ABS is conditioned in its deactivated state. In this case, the fluid flow having the rapidly increased master-cylinder pressure into the second fluid chamber 126 is constructed by means of the fixed orifice 134, while the fluid flow having the same into the first fluid chamber 125 is permitted. Thus, the fluid pressure in the second fluid chamber 126 is very slowly increased, and the fluid pressure in the first fluid chamber 125 is quickly increased, with the result that the pressure difference between the second fluid chamber 126 and the first fluid chamber 125 develops, and the pressure difference between the first fluid chamber 125 and the third fluid chamber 124 becomes above the predetermined threshold. Under these conditions, the piston 122 tends to move leftwards due to the pressure difference between the first fluid chamber 125 and the third fluid chamber 124. On the other hand, the mushroom-type valve body 143 tends to move rightwards due to the pressure difference between the first fluid chamber 125 and the second fluid chamber 126. Consequently, the throttling valve 140, i.e., the flow control valve 120 is retained in its fully open state. As set forth above, the master-cylinder pressure is quickly fed through the flow control valve 120 conditioned in the valve open position and the inlet valve 6 conditioned in the fully open position into the wheel cylinder 4, during quick braking where the ABS is still deactivated. As will be appreciated from the above, the construction of the flow control valve 120 of the second embodiment insures a superior braking response even during quick braking.

Third embodiment

Figure 5:
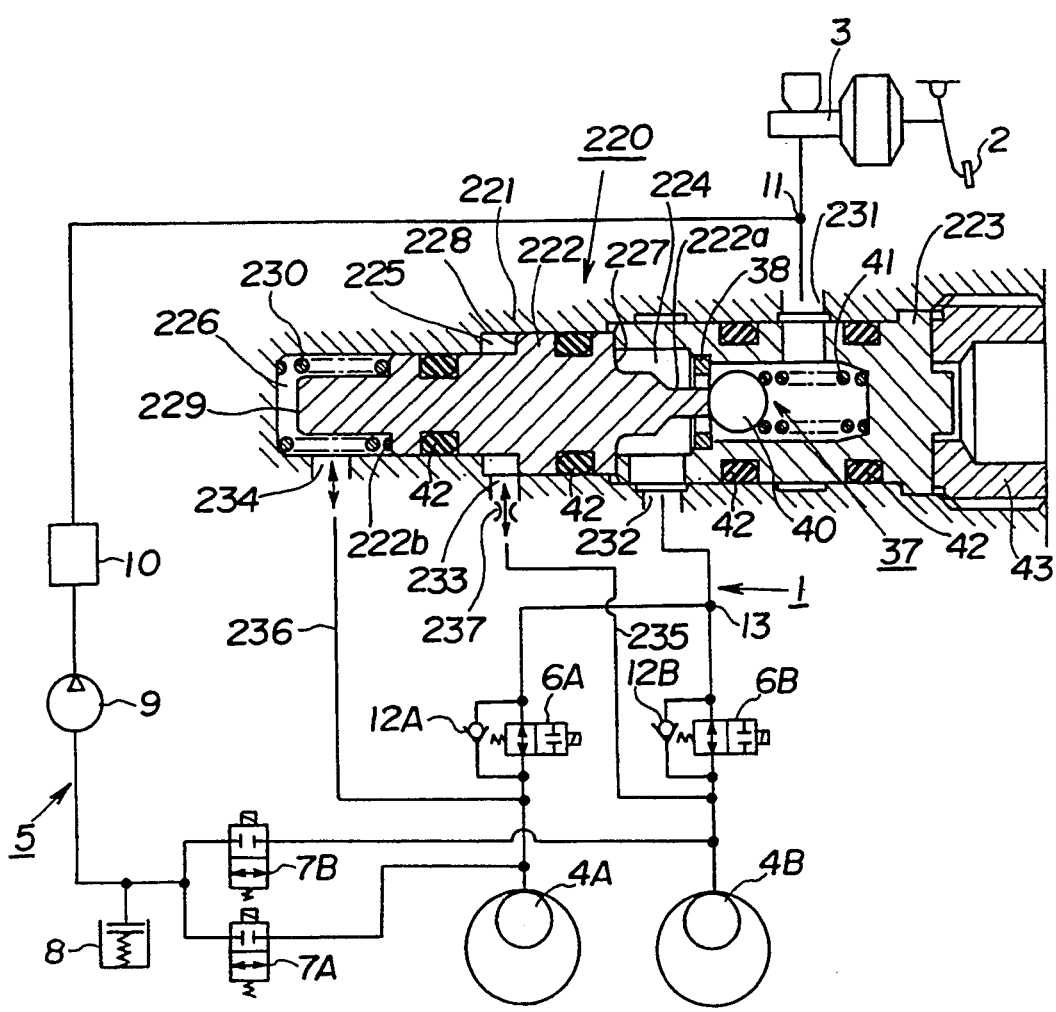
FIG. 5 is a schematic system diagram illustrating a third embodiment of a brake-fluid reflux type anti-skid brake control system according to the invention.

Referring now to FIG. 5, there is shown a brake-fluid reflux type anti-skid brake control system including a brake-fluid flow control valve applied commonly to two wheel cylinders, such as left and right wheel cylinders 4A and 4B. The brake-fluid flow control valve employed in the brake-fluid reflux type anti-skid brake control system of the third embodiment is different from that of the first embodiment, in that the flow control valve is conditioned in a fully throttling position when at least one of the pressure difference between the fluid pressure of the master-cylinder side and the fluid pressure of one wheel side and the pressure difference between the fluid pressure of the master-cylinder side and the fluid pressure of the other wheel side is greater than or equal to a predetermined threshold value. For the purpose of simplification of description, the same reference numerals used in the anti-skid brake control system of the first embodiment will be applied to the corresponding elements used in the third embodiment of FIG. 5.

As shown in FIG. 5, the brake-fluid flow control valve 220 of the third embodiment is arranged between the confluent point 11 and a branch point 13 through which the fluid pressure of the master-cylinder side is branched into an inlet valve 6A associated with a left wheel cylinder 4A and an inlet valve 6B associated with a right wheel cylinder 4B. The brake fluid flow control valve 220 includes a substantially cylindrical valve housing 221, an axially slidable piston 222, and a partition member 223. A first fluid chamber 224, a second fluid chamber 225, and a third fluid chamber 226 are defined in the cylindrical hollow bored in the housing 221, when inserting the piston 222 and the partition member 223 into the cylindrical hollow of the housing 221. The piston 222 has a first pressure receiving surface 227 responsive to the fluid pressure in the first fluid chamber 224, a second pressure receiving surface 228 responsive to the fluid pressure in the second fluid chamber 225, and a third pressure receiving surface 229 responsive to the fluid pressure in the third fluid chamber 226. A spring seat 222b is formed on the third pressure receiving surface 229, for receiving one end of a return spring 230. The return spring 230 is operable disposed between the spring seat 222b and the inner end wall of the housing 221 defining the third fluid chamber 226, by virtue of the left side end of the piston 222. The piston 222 is normally biased rightwards (viewing FIG. 5). The valve housing 221 of the third embodiment has four ports, namely first and second ports 231 and 232 respectively exposing to the first fluid chamber 224, a third port 233 exposing to the second fluid chamber 225, and a fourth port 234 exposing to the third fluid chamber 226. The first port 231 communicates the first fluid chamber 224 with the outlet port of the master cylinder 3, while the second port 232 communicates the first fluid chamber 224 with the branch point 13. The third port port 233 is connected through a hydraulic line 235 to the inlet-and-outlet port of the wheel cylinder 4B such that the second pressure receiving surface 228 is susceptible to a change in the right wheel-cylinder pressure, while the fourth port 234 is connected through a hydraulic line 236 to the inlet-and-outlet port of the wheel cylinder 4A such that the third pressure receiving surface 229 is susceptible to a change in the left wheel-cylinder pressure. Reference numeral 7A designates an outlet valve associated with the left wheel cylinder 4A, while reference numeral 7B designates an outlet valve associated with the right wheel cylinder 4B. The outlet ports of the respective outlet valves 7A and 7B are connected to the brake-fluid reservoir 8. A check valve 12A is arranged parallel to the inlet valve 6A so as to return the brake fluid in the left wheel cylinder 4A to the master cylinder under a brake releasing condition, while a check valve 12B is arranged parallel to the inlet valve 6B in the same manner as the check valve 12A. The flow control valve 220 of the third embodiment includes the same throttling valve 40 as the first embodiment. The throttling valve 40 is disposed in an intermediate fluid passage arranged between the first and second ports 231 and 232. The piston has a relatively small-diameter push rod portion 222a whose end surface is contact with the spherical surface of the ball-type valve body 40 of the throttling valve 37. As clearly shown in FIG. 5, note that a fixed orifice 237 is provided in the line 235. It is advantageous that such an orifice is arranged in either one of the lines 235 and 236, as hereinafter described in detail.

In the flow control valve 220 of the third embodiment, The total area obtained by adding an area of the second pressure receiving surface 228 to an area of the third pressure receiving surface 229 is designed to be equal to an area of the first pressure receiving surface 227. In addition, the area of the second pressure receiving surface 228 is designed to be equal to the area of the third pressure receiving surface 229, although the shapes of the second and third pressure receiving surfaces 228 and 229 are different from each other, i.e., the surface 228 is annular in shape, while the surface 229 is circular in shape. As appreciated from the above, since the second pressure receiving surface 228 susceptible to a pressure-reduction in the right wheel cylinder 4B and the third pressure receiving surface 229 susceptible to a pressure-reduction in the left wheel cylinder 4A have an identical area, the piston 222 is pilot-operated equivalently to both the above-noted two pressure-reductions.

Concerning an axial sliding movement of four members 230, 222, 40 and 41 arranged in series to each other, spring constants of the springs 230 and 41 are designed such that the valve body 40 is kept in a fully open position when both the pressure difference between the first fluid chamber 224 and the second fluid chamber 225 and the pressure difference between the first fluid chamber 224 and the third fluid chamber 226 are less than a predetermined threshold value, while the valve body 40 is kept in a fully throttling position when at least one of the above-mentioned two pressure differences are greater than or equal to the threshold.

The flow control valve 220 employed in the ABS of the third embodiment operates as follows.

During normal braking, the master-cylinder pressure acts on the first fluid chamber 224. In such an ABS deactivated state, the control unit (not shown) generates zero-duty signals to the inlet valves 6A and 6B and the outlet valves 7A and 7B, with the result that each of the inlet valves 6A and 6B is kept in a fully open position and each of the outlet valves 7A and 7B is kept in a fully closed position. Under these conditions, the brake fluids in the wheel cylinders 4A and 4B are not exhausted into the reservoir 8. Thus, the pressure difference between the first fluid chamber 224 and the second fluid chamber 225, and the pressure difference between the first fluid chamber 224 and the third fluid chamber 226 are both kept lower than a predetermined threshold value. Thus, the throttling valve 37 is kept in the fully open position, with the result that the master-cylinder pressure is supplied through the flow control valve 220 via the two inlet valves 6A and 6B to the two wheel cylinders 4A and 4B. Accordingly, a fluid pressure in each wheel cylinder is increased with a high braking response, during normal braking.

In the case that both the left and right wheel-cylinder pressures are reduced during the anti-skid brake control, for example, when the control unit detects both of the right and left wheels are locked, the control unit generates 100%-duty signals to the inlet valves 6A and 6B, and to the outlet valves 7A and 7B, and therefore each valve position is switched. Thereafter, the ABS pump 9 is driven with a slight time lag. After switching of each valve, the brake fluid in each wheel cylinder is exhausted into the reflux circuit 5 and thus the wheel-cylinder pressure in each wheel cylinder is gradually reduced during rotation on the ABS pump. In this way, the pressure-reduction in each wheel cylinder develops, so as to avoid the wheel-lock. In the aforementioned ABS pressure reducing mode, the pressure difference between the first fluid chamber 224 and the second fluid chamber 225 and the pressure difference between the first fluid chamber 224 and the third fluid chamber 226 both become greater than the predetermined threshold value. Accordingly, the piston 222 moves leftwards against the spring force created by the spring 230 and as a result the abutment surface between the end of the push rod 222a and the spherical surface of the valve body 40 is also moved in an its axially leftward direction. In this manner, the throttling valve 37 is shifted from the fully open position to the fully throttling position. The throttling valve 37 is necessarily held in the fully throttling position at the end of the ABS pressure reducing mode. Thereafter, immediately the control unit detects that both of the wheels are unlocked, the operational mode of the ABS is changed from the ABS pressure reducing mode to the ABS pressure intensifying mode. In the ABS pressure intensifying mode, the control unit generates zero-duty signals to the valves 6A, 6B, 7A, and 7B. Each valve is switched again. At the beginning of the ABS pressure intensifying mode, since the pressure difference between the first fluid chamber 224 and the second fluid chamber 225 and the pressure difference between the first fluid chamber 224 and the third fluid chamber 226 are still above the predetermined threshold, the flow control valve 220 is maintained in the fully throttling state. Therefore, the flow control valve 220 operates to assure a designated restricted brake-fluid flow through an orifice constriction in the ABS pressure intensifying mode, until both the above-noted pressure differences become below the predetermined threshold. In this manner, the ABS of the third embodiment controls the wheel-cylinder pressure in each wheel cylinder, such that the wheel-cylinder pressure is moderately intensified at a designated gradient of pressure-rise, so as to assure a moderate wheel-cylinder pressure intensifying characteristics in the ABS pressure intensifying mode.

In the case that either one of the left and right wheel-cylinder pressures is reduced and the other wheel-cylinder pressure is held constant or increased in accordance with the anti-skid brake control, for example, when the control unit detects only one of the right and left wheels is locked, the control unit generates 100%-duty signals to the inlet valve associated with the locked wheel and to the outlet valve associated with the locked wheel. Thereafter, the wheel-cylinder pressure in the locked wheel is gradually reduced in accordance with rotation of the ABS pump. The pressure-reduction in the wheel cylinder of the locked wheel develops to a considerable degree and thus the pressure difference between the first fluid chamber 224 and the fluid chamber associated with the locked wheel becomes greater than the predetermined threshold value. Accordingly, the piston 222 moves leftwards to permit the throttling valve 37 to be shifted from the fully open position to the fully throttling position. Therefore, the throttling valve 37 is held in the fully throttling position at the end of the ABS pressure reducing mode for the wheel cylinder employed in the locked wheel. Thereafter, immediately the control unit detects that the locked wheel becomes unlocked, the operational mode of the ABS is changed into the ABS pressure intensifying mode. In the ABS pressure intensifying mode, the control unit generates zero-duty signals to the valves to shift to their normal positions. At the beginning of the ABS pressure intensifying mode, since the pressure difference between the first fluid chamber 224 and one of the second and third fluid chambers associated with the locked wheel is still greater than the predetermined threshold, the flow control valve 220 is maintained in the fully throttling state. Therefore, the flow control valve 220 operates to assure a designated restricted brake-fluid flow through an orifice constriction during operation of the ABS, until the above-noted pressure difference becomes below the predetermined threshold. As set forth above, the ABS of the third embodiment can assure a moderate wheel-cylinder pressure intensifying characteristics, even when either one of the left and right wheel-cylinder pressures is reduced and the other wheel-cylinder pressure is held constant or increased in accordance with the anti-skid brake control.

During quick braking, such as hard braking on dry pavement, if the master-cylinder pressure is rapidly increased, but the wheel is still not locked, the ABS is conditioned in its deactivated state. In this case, the rapidly increased master-cylinder pressure is introduced into the first fluid chamber 224. Due to a rapid pressure-rise of the brake fluid in the first fluid chamber 224, the pressure difference between the first and second fluid chambers 224 and 225 and the pressure difference between the first and third fluid chambers 224 and 226 both become greater than the predetermined threshold. Under this condition, although the piston 222 tends to move in an axially rightward direction, the piston 222 is scarcely moved, because of an orifice constriction of the orifice 237 arranged in the line 235 intercommunicating the port 233 and the right wheel cylinder 4B. That is, the orifice 237 serves as a damper for restricting the outgoing fluid flow caused by a rapid, axially leftward movement of the piston 222 fluid flow. Consequently, a relative position of the piston 222 to the housing 221 is retained almost unchanged. The flow control valve 220 is retained in its fully open state during quick braking where the ABS is in its inoperative state. As a result, the master-cylinder pressure is quickly fed through the flow control valve 220 conditioned in the valve open position and the inlet valves 6A and 6B conditioned in the fully open positions into the wheel cylinders 4A and 4B, in order to insure a high braking response, even during quick braking where the ABS is still deactivated.

As will be appreciated from the previously described embodiments, a brake-fluid flow control valve employed in an anti-skid brake control system according to the invention operates in a fully open mode to permit a maximum fluid flow of brake fluid flowing from the master-cylinder side to the wheel-cylinder side, when the pressure difference between a fluid pressure of the master-cylinder side and a fluid pressure of the wheel-cylinder side is less than a predetermined threshold value due to a relatively gentle pressure gradient during normal braking or when the above-mentioned pressure difference becomes greater than or equal to the predetermined threshold value due to a rapid increase in the fluid pressure of the master-cylinder side during quick braking where the ABS is conditioned in an inoperative state, and operates in a fully throttling mode to assure a moderate wheel-cylinder pressure intensifying characteristic when the above pressure difference is greater than or equal to the predetermined threshold value due to a pressure-reduction of the wheel-cylinder side during operation of the ABS. Since the flow control valve employed in the ABS according to the invention, is responsible to a steep positive pressure gradient in the fluid pressure of the master-cylinder side, as well as the previously noted pressure difference, the flow control valve can assure a moderate wheel-cylinder pressure intensifying characteristics in the ABS pressure intensifying mode and provide a high braking response during quick braking under a deactivated state of the ABS.

Although the throttling valve 40 used in the first and third embodiments is actuated by the push rod of the piston slidably enclosed in the valve housing, the throttling device may be comprised of a spool valve which is capable of varying an area of a fluid passage of an inlet port and/or an outlet port of the valve, for switching a fully open fluid passage to a fully throttled fluid passage, and vice versa, depending on a relative position of the spool to the housing.

While the foregoing is a description of the preferred embodiments for carrying out the invention, it will be understood that the invention is not limited to particular embodiments shown and described herein, but that various changes and modifications may be made without departing from the scope or spirit of this invention as defined by the following claims.

What is claimed is:

1. A brake-fluid reflux type anti-skid brake control system for automotive vehicles, comprising:

a main brake-fluid supply circuit for supplying a brake fluid from a master cylinder to a wheel cylinder, during braking;

a brake-fluid reflux circuit arranged in parallel with said main brake-fluid supply circuit, for pressurizing and refluxing the brake fluid from said wheel cylinder to said main brake-fluid supply circuit, during operation of the anti-skid brake control system;

flow control valve means being arranged in said main brake-fluid supply circuit, for controlling a flow rate of the brake fluid introduced into said wheel cylinder in response to a pressure difference between the fluid pressure of a master-cylinder side and a fluid pressure of the wheel-cylinder side, such that when said pressure difference is less than a predetermined threshold value said flow control valve means operates in a fully open mode in which said flow control valve means provides a maximum flow rate of the brake fluid, and when said pressure difference is greater than or equal to said predetermined threshold value said flow control valve means operates in a fully throttling mode in which said flow control valve means provides a minimum flow rate of the brake fluid; and said flow control valve means including a valve housing defining a substantially cylindrical hollow therein, a piston slidably enclosed in said cylindrical hollow to be movable depending on said pressure difference, partition means arranged in said cylindrical hollow for partitioning an internal space facing onto one end of said piston into first and second fluid chambers, said first fluid chamber being arranged in series to said main brake-fluid supply circuit to introduce the fluid pressure of the master-cylinder side into said wheel cylinder therethrough, said second fluid chamber connected to a communication passage to receive the fluid pressure of the master-cylinder side, said housing cooperative with said piston to define a third fluid chamber essentially corresponding to an internal space facing onto the other end of said piston, said third fluid chamber receiving the fluid pressure of the wheel-cylinder side, and a throttling valve arranged in said first fluid chamber to operate at either one of said two modes based on an axial sliding movement of said piston, an area of a first pressure receiving surface of said piston facing onto said first fluid chamber being considerably smaller than an area of a second pressure receiving surface of said piston facing onto said second fluid chamber such that said first pressure receiving surface is insusceptible to a rapid pressure-rise in said first fluid chamber during quick braking where the anti-skid brake control system is in an inoperative state, and an orifice being provided in said communication passage and responsive to a steep pressure gradient in the fluid pressure of the master-cylinder side such that a pressure-rise in said second fluid chamber is suppressed through an orifice constriction of said orifice during quick braking.

2. The anti-skid brake control system as set forth in claim 1, wherein the sum of the areas of said first and second pressure receiving surfaces is equal to an area of a third pressure receiving surface of said piston facing onto said third fluid chamber.

3. A brake-fluid reflux type anti-skid brake control system for automotive vehicles, comprising:

a main brake-fluid supply circuit for supplying a brake fluid from a master cylinder to a wheel cylinder, during braking;

a brake-fluid reflux circuit arranged in parallel with said main brake-fluid supply circuit, for pressurizing and refluxing the brake fluid from said wheel cylinder to said main brake-fluid supply circuit, during operation of the anti-skid brake control system;

flow control valve means being arranged in said main brake-fluid supply circuit, for controlling a flow rate of the brake fluid introduced into said wheel cylinder in response to a first pressure difference between a fluid pressure of the master-cylinder side and a fluid pressure of the wheel-cylinder side, such that when said first pressure difference is less than a predetermined threshold value said flow control valve means operates in a fully open mode in which said flow control valve means provides a maximum flow rate of the brake fluid, and when said first pressure difference is greater than or equal to said predetermined threshold value said flow control valve means operates in a fully throttling mode in which said flow control valve means provides a minimum flow rate of the brake fluid; and said flow control valve means including a valve housing defining a substantially cylindrical hollow therein, a piston slidably enclosed in said cylindrical hollow to be movable depending on said first pressure difference, partition means arranged in said cylindrical hollow for partitioning an internal space facing onto one end of said piston into first and second fluid chambers, said first fluid chamber being arranged in series to said main brake-fluid supply circuit to introduce the fluid pressure of the master-cylinder side into said wheel cylinder therethrough, said second fluid chamber connected to a communication passage to receive the fluid pressure of the master-cylinder side, said housing cooperative with said piston to define a third fluid chamber essentially corresponding to an internal space facing onto the other end of said piston, said third fluid chamber receiving the fluid pressure of the wheel-cylinder side, an orifice being provided in said communication passage and responsive to a steep pressure gradient in the fluid pressure of the master-cylinder side to cause a second pressure difference between said first and second pressure chambers, and a throttling valve arranged in said first fluid chamber to operate at either one of said two modes, said throttling valve including a valve body and a spring resiliently biasing said valve body to the one end of said piston, said valve body slidably received by said partition means, one end of said valve body facing onto said first fluid chamber and the other end of said valve body facing onto said second fluid chamber, whereby said valve body is movable depending on said second pressure difference such that said valve body moves along with said piston when said second pressure difference is less and moves away from said piston when said second pressure difference is great.

4. A brake-fluid reflux type anti-skid brake control system for automotive vehicles, comprising:

a main brake-fluid supply circuit for supplying a brake fluid from a master cylinder to left and right wheel cylinders, during braking;

a brake-fluid reflux circuit arranged parallel with said main brake-fluid supply circuit, for pressurizing and refluxing the brake fluid from said wheel cylinders to said main brake-fluid supply circuit, during operation of the anti-skirt brake control system;

flow control valve means being arranged in said main brake-fluid supply circuit, for controlling a flow rate of the brake fluid introduced into each of said wheel cylinders in response to a pressure difference between a fluid pressure of the master-cylinder side and a fluid pressure of the wheel-cylinder side, such that when said pressure difference is less than a predetermined threshold value said flow control valve means operates in a fully open mode in which said flow control valve means provides a maximum flow rate of the brake fluid, and when said pressure difference is greater than or equal to said predetermined threshold value said flow control valve means operates in a fully throttling mode in which said flow control valve means provides a minimum flow rate of the brake fluid; and said flow control valve means including a valve housing defining a substantially cylindrical hollow therein, a piston slidably enclosed in said cylindrical hollow to be movable depending on said pressure difference, partition means arranged in said cylindrical hollow for defining a first fluid chamber facing onto one end of said piston, said first fluid chamber being arranged in series to said main brake-fluid supply circuit to introduce the fluid pressure of the master-cylinder side into said wheel cylinders therethrough, said housing cooperative with said piston to define second and third fluid chambers, said second fluid chamber connected through a communication passage to said right wheel cylinder to receive the fluid pressure of the right wheel-cylinder side, said third fluid chamber connected through another communication passage to said left wheel cylinder to receive the fluid pressure of the left wheel-cylinder side, and an orifice being provided in either one of said two communication passages to restrict the brake fluid flow directed out of the fluid chamber associated with the communication passage having said orifice, during quick braking.

5. The anti-skid brake control system as set forth in claim 4, wherein an area of a second pressure receiving surface of said piston facing onto said second fluid chamber is equal to an area of a third pressure receiving surface of said piston facing onto said third fluid chamber.

6. The anti-skid brake control system as set forth in claim 5, wherein the sum of the areas of said second and third pressure receiving surfaces is equal to an area of a first pressure receiving surface of said piston facing onto said first fluid chamber.

* * * * *